(12) United States Patent
Reynolds et al.

(10) Patent No.: US 8,946,603 B2
(45) Date of Patent: Feb. 3, 2015

(54) DRAIN/FILL FITTING

(75) Inventors: Kenneth M. Reynolds, Stanwood, WA (US); Charles F. Forster, Arlington, WA (US)

(73) Assignee: BE Aerospace, Inc., Wellington, FL (US)

( * ) Notice: Subject to any disclaimer, the term of this patent is extended or adjusted under 35 U.S.C. 154(b) by 612 days.

(21) Appl. No.: 13/234,895

(22) Filed: Sep. 16, 2011

(65) Prior Publication Data
US 2013/0068752 A1    Mar. 21, 2013

(51) Int. Cl.
| | |
|---|---|
| H05B 3/06 | (2006.01) |
| H05B 3/00 | (2006.01) |
| H05B 11/00 | (2006.01) |
| E03B 7/10 | (2006.01) |
| F16L 53/00 | (2006.01) |
| F24H 1/10 | (2006.01) |
| H05B 3/78 | (2006.01) |
| B64D 11/02 | (2006.01) |

(52) U.S. Cl.
CPC ............... *F16L 53/008* (2013.01); *B64D 11/02* (2013.01)
USPC ............. 219/523; 219/201; 219/536; 138/33; 138/35; 392/488; 392/489

(58) Field of Classification Search
CPC ............ H05B 3/00; H05B 3/80; F24H 1/102; F24H 1/142; F28F 1/42; F28F 1/12; F28F 1/30; F02F 1/08
USPC .................. 219/201, 523, 536; 392/479–480, 392/486–489; 165/178–182; 138/33, 35; 137/341
See application file for complete search history.

(56) References Cited

U.S. PATENT DOCUMENTS

| | | | |
|---|---|---|---|
| 2003/0138244 A1* | 7/2003 | Long et al. ..................... | 392/485 |
| 2004/0053039 A1* | 3/2004 | Ekstrom et al. ............... | 428/325 |
| 2011/0215077 A1* | 9/2011 | Smiles et al. .................. | 219/201 |

* cited by examiner

*Primary Examiner* — Tu B Hoang
*Assistant Examiner* — Michael Hoang
(74) *Attorney, Agent, or Firm* — Shumaker, Loop & Kendrick, LLP

(57) ABSTRACT

An aircraft drain/fill fitting includes a housing adapted for being fitted into an opening between an aircraft interior and an aircraft exterior. The housing has an interior housing segment fluidly coaxially communicating with an exterior housing segment to define a liquid flow path therethrough, and a heater for applying heat to the interior housing segment. A hollow insert element is positioned in the interior housing segment in heat transfer contact with an inner wall of the interior housing segment. An elongate heat transfer probe is positioned in heat transfer contact with the hollow insert element and extends into the exterior housing segment to reduce the incidence of freezing of liquid in the exterior housing segment.

14 Claims, 1 Drawing Sheet

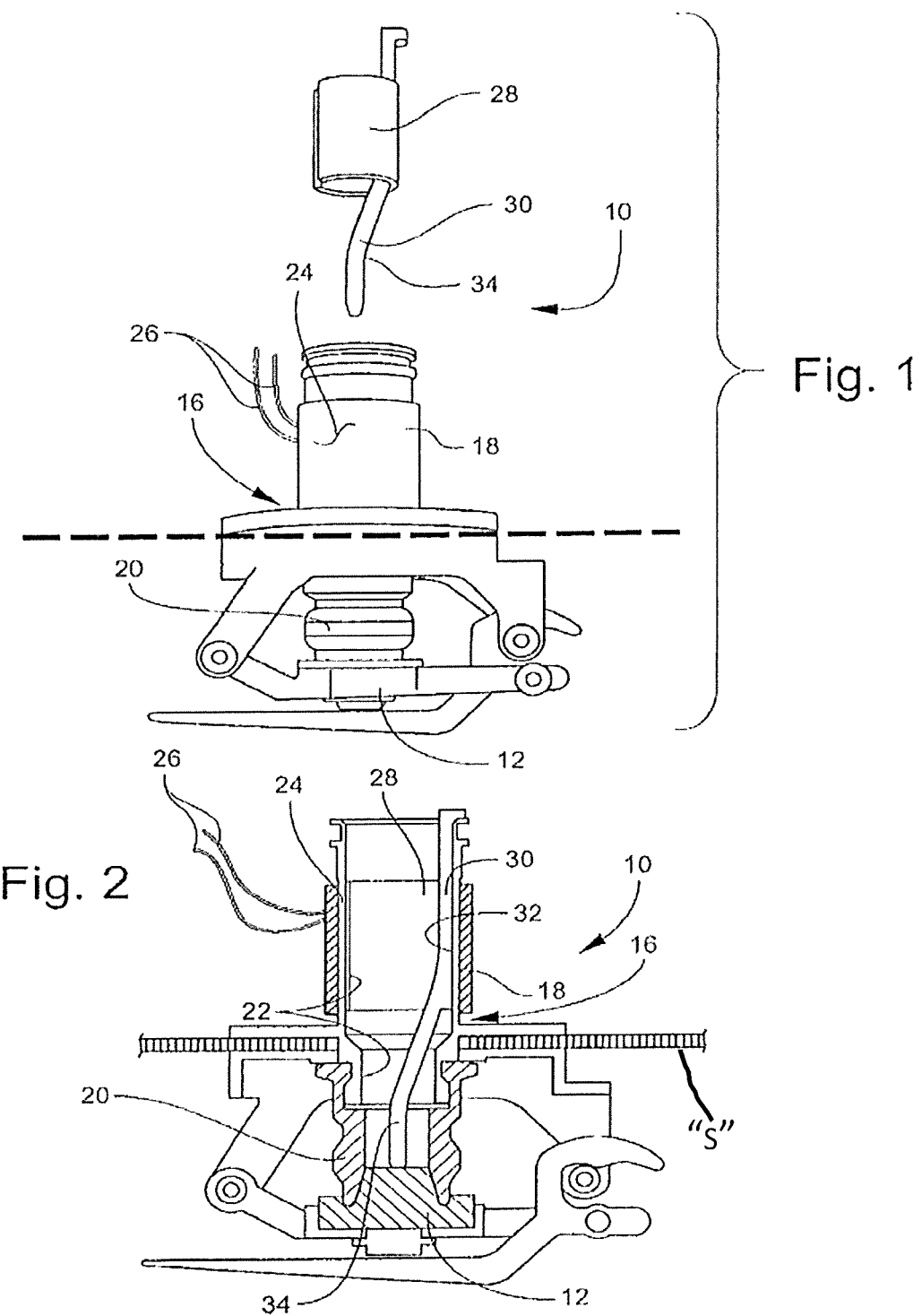

DRAIN/FILL FITTING

TECHNICAL FIELD AND BACKGROUND OF THE INVENTION

This invention relates to a drain/fill fitting of the general type utilized to fill and drain liquid tanks, such as commonly used in aircraft potable water and lavatory water supply tanks. Aircraft are exposed to frigid temperatures during high-altitude cruise. The environmental lapse rate (ELR), is the rate of decrease of temperature with altitude in the stationary atmosphere at a given time and location. The International Civil Aviation Organization defines an international standard atmosphere as having a temperature lapse rate of 6.49° C./1,000 m (3.56° F./1,000 Ft) from sea level to 11 kilometers (36,000 ft). From 11 to 20 kilometers (36,000 to 66,000 ft), the constant temperature is −56.5° C. (−69.7° F.). Thus, exterior aircraft surfaces and components at normal cruising altitudes in these ranges are subjected to temperatures far below the freezing temperature of water.

Components such as fittings and valves are provided with coaxial or surface-mounted heaters to prevent ice buildup which can cause a frozen plug to block passages in these devices. In addition, elaborate procedures are often required to ensure that these devices are completely free of water that can freeze at high altitudes.

Coaxial heaters are prone to electrical shorts that can cause complete failure of the heater. Surface heaters are not effective when drain/fill fittings are mounted against the skin of the aircraft or other metal surface due to the fact that the metal surface has sufficient mass to act as a heat sink that can remove heat added by the heater faster than it can be supplied. This is true even when there is a heated space behind the fitting in the aircraft interior. The exterior housing portion of the fitting will thus remain extremely cold and will quickly freeze any liquid remaining in the fitting after a filling or draining operation.

SUMMARY OF THE INVENTION

Therefore, it is an object of the invention to assist the thermal efficiency of any type of heating system used to prevent, reduce or eliminate ice in a fitting or valve exposed to below freezing temperatures.

It is another object of the invention to assist the thermal efficiency of any type of heating system used to prevent, reduce or eliminate ice in an aircraft drain/fill fitting exposed to below freezing temperatures.

It is another object of the invention to provide a drain/fill fitting that improves the thermal efficiency of a heating system used to prevent, reduce or eliminate ice in an aircraft drain/fill fitting exposed to below freezing temperatures.

It is another object of the invention to provide a retrofit device for use in a drain/fill fitting that improves the thermal efficiency of a heating system used to prevent, reduce or eliminate ice in an aircraft drain/fill fitting exposed to below freezing temperatures.

These and other objects and advantages of the invention are achieved by providing a drain/fill fitting that includes a housing adapted for being fitted into an opening between a first, relatively temperate environment and a below-freezing environment, and a first housing segment positioned in the temperate environment fluidly communicating with a second housing segment exposed to the below-freezing environment to define a liquid flow path therethrough. A heater applies heat to the first housing segment, and an elongate heat transfer probe is positioned in heat transfer contact with the first housing segment and extends into the second housing segment to reduce the incidence of freezing of liquid in the second housing segment exposed to the below-freezing environment.

According to another embodiment of the invention, the first and second housing segments are coaxial and annular, and the elongate probe includes a high thermal transfer coefficient material for efficiently transferring heat from the hollow insert element and along the length of the elongate heat transfer probe.

According to another embodiment of the invention, the heater comprises an electric conduction heater and a hollow insert element is positioned in heat transfer relation on an interior wall of the first housing segment. The elongate heat transfer probe includes a high thermal transfer coefficient material for efficiently transferring heat from the hollow insert element and along the length of the elongate heat transfer probe.

According to another embodiment of the invention, the elongate heat transfer probe includes a bend intermediate opposing ends for positioning one portion of the probe along an axially-extending inner wall of the hollow insert element and a second portion in the flow path of the second housing segment.

According to another embodiment of the invention, the heat transfer probe is shaped along its length to be in heat transfer contact with an inner wall of the hollow insert element and in spaced-apart relation from inner walls of the second housing segment in the flow path within the second housing segment.

According to another embodiment of the invention, an aircraft drain/fill fitting includes a housing adapted for being fitted into an opening between an aircraft interior and an aircraft exterior. The housing has an interior housing segment fluidly coaxially communicating with an exterior housing segment to define a liquid flow path therethrough, and a heater for applying heat to the interior housing segment. A hollow insert element is positioned in the interior housing segment in heat transfer contact with an inner wall of the interior housing segment. An elongate heat transfer probe is positioned in heat transfer contact with the hollow insert element and extends into the exterior housing segment to reduce the incidence of freezing of liquid in the exterior housing when the exterior housing is exposed to a below-freezing environment.

According to another embodiment of the invention, the elongate heat transfer probe includes a high thermal transfer coefficient material for efficiently transferring heat from the hollow insert element and along the length of the elongate heat transfer probe.

According to another embodiment of the invention, the elongate probe includes a high thermal transfer coefficient material selected from the group consisting of aluminum, copper and graphene, and having a W/mK of between 250 and 5300.

According to another embodiment of the invention, a heat transfer device is provided for transferring heat from an interior housing segment to an exterior housing segment of an aircraft drain/fill fitting positioned in an opening in an aircraft skin, and includes a hollow insert element for being positioned in the interior housing segment in heat transfer contact with an inner wall of the inner housing segment; and an elongate heat transfer probe positioned in heat transfer contact with the hollow insert element and adapted for extending into the exterior housing segment to reduce the incidence of freezing of liquid in the exterior housing segment when exposed to a below-freezing environment.

According to another embodiment of the invention, the heat transfer probe is in heat transfer contact with an inner wall of the hollow insert element and is shaped along its length to be in heat transfer contact with an inner wall of the hollow insert element and to be in spaced-apart relation from inner walls of the exterior housing segment and in the flow path within the exterior housing segment.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 1 is a partially-exploded view of a drain/fill fitting according to one embodiment of the present invention; and FIG. 2 is a vertical cross-sectional view of a drain/fill fitting according to one embodiment of the present invention.

DESCRIPTION OF THE PREFERRED EMBODIMENT AND BEST MODE

Referring now to FIGS. 1 and 2, a drain/fill fitting 10 according to one preferring embodiment of the invention is shown. The drain/fill fitting 10 is of a general type fitted in an opening formed in the skin "S" of an aircraft. One such general type of fitting is made by Rockwell Collins, and includes a lever lock cap 12.

The drain/fill fitting 10 includes a housing 16 fitted into an opening. Housing 16 includes an interior housing segment 18 fluidly coaxially communicating with an exterior housing segment 20, which functions as a connector to a drain/fill hose. The interior and exterior housing segments 18 and 20 collectively define a liquid flow path 22 through the drain/fill fitting 10. A heater 24 contained in the interior housing segment 18 is connected by suitable wiring 26 to an electrical source for applying heat to the interior housing segment 18. This type of interior heating is conventional.

In accordance with one preferred embodiment of the invention, a hollow insert element 28 is positioned coaxially in the interior housing segment 18 in heat transfer contact with the interior housing segment 18. The hollow insert element 28 is fabricated of a suitable material with a high rate of heat transfer. An elongate heat transfer probe 30 is positioned in heat transfer contact with the hollow insert element 28. As shown in FIG. 2, the probe 30 is mounted in an axially-extending orientation along one inner side wall 32 of the interior housing segment 18. As is also shown, the probe 30 is shaped with a bend 34 in the area where the probe 30 enters the exterior housing segment 20.

As is best shown in FIG. 2, the probe 30 is positioned within the flowpath 22 in spaced-apart relation to the inner walls of the exterior housing segment 20. The effect is to passively transfer heat from the sidewalls 32 of the interior housing segment 18 to the flowpath 22 of the exterior housing segment 20 and thereby reduce the incidence of freezing of liquid in the exterior housing segment 20 when exposed to a below-freezing environment. Because the probe 30 does not contact the cold exterior housing segment 20 of the fitting 10, heat is transferred from the heater 24 to the location in the flowpath 22 within the exterior housing segment 20 where ice is most likely to occur.

The probe 30 is preferably fabricated of a material having a high thermal transfer coefficient. Preferred examples of such materials are aluminum, copper and graphene, and having a W/mK of between about 250 and 5300, with aluminum being the most preferred because of its light weight and low cost. Aluminum has a W/mK of about 250, depending on the particular alloy being used.

The insert element 28 and probe 30 are suitable both for being retrofitted into existing drain/fill fittings, and being incorporated into a drain/fill fitting as part of newly manufactured products. Use of the insert element 28 and probe 30 does not require modification of the electrical heater already a part of such drain/fill fittings. The probe 30 does not interfere with operation of the drain/fill fitting 10 or its connection to exterior supply hoses. In newly manufactured drain/fill fittings, the insert element may be dispensed with, and the probe attached directly to an inner wall surface of the interior housing segment—the same or similar geometry placing the probe in spaced-apart relation to the sidewalls of the exterior housing segment.

As noted above, while the novel drain/fill fitting and insert element and probe part of the drain/fill fitting have been described in relation to use in aviation-related applications, their use is not limited to such uses, but have application in any environment where drain and/or fill fittings may be exposed to frigid environments where liquid within the fitting may freeze and plug the fitting.

A drain/fill fitting, and an insert element and probe for use with a drain/fill fitting are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A drain/fill fitting, comprising:
   (a) a housing adapted for being fitted into an opening between a first temperate environment and a below-freezing environment, and including a first housing segment positioned in the temperate environment fluidly communicating with a second housing segment exposed to the below-freezing environment to define a liquid flow path therethrough;
   (b) a heater for applying heat to the first housing segment configured to be permanently positioned within the and embedded in the first housing segment;
   (c) an elongate heat transfer probe configured to be permanently positioned in the drain/fill fitting and in heat transfer contact with the first housing segment and extending into the second housing segment to reduce the incidence of freezing of liquid in the second housing segment exposed to the below-freezing environment, wherein:
   the elongate heat transfer probe is configured to axially extend along an inner wall of a hollow insert element and be within a flow path of the second housing segment, wherein the hollow insert element is configured to be positioned in heat transfer relation on an interior wall of the first housing segment.

2. The drain/fill fitting according to claim 1, wherein the first and second housing segments are coaxially aligned and annular.

3. The drain/fill fitting according to claim 1, wherein the elongate probe includes a high thermal transfer coefficient material for efficiently transferring heat along the length of the elongate heat transfer probe.

4. The drain/fill fitting according to claim 1, wherein the heater comprises an electric conduction heater.

5. The drain/fill fitting according to claim 1, wherein the elongate heat transfer probe includes a high thermal transfer coefficient material for efficiently transferring heat from the hollow insert element and along the length of the elongate heat transfer probe, and further wherein the heater comprises an electric conduction heater.

6. The drain/fill fitting according to claim 2, wherein the elongate heat transfer probe includes a bend intermediate opposing ends for positioning one portion of the probe along an axially-extending inner wall of the hollow insert element and a second portion in the flow path of the second housing segment.

7. The drain/fill fitting according to claim 1, wherein the heat transfer probe is shaped along the length of the heat transfer probe to be in heat transfer contact with the inner wall of the hollow insert element and in spaced-apart relation from inner walls of the second housing segment in the flow path within the second housing segment.

8. An aircraft drain/fill fitting, comprising:
(a) a housing adapted for being fitted into an opening between an aircraft interior and an aircraft exterior, and including an interior housing segment fluidly coaxially communicating with an exterior housing segment to define a liquid flow path therethrough;
(b) a heater for applying heat to the interior housing segment permanently positioned within the aircraft drain/fill fitting and embedded in the interior housing segment;
(c) a hollow insert element positioned in the interior housing segment in heat transfer contact with an inner wall of the interior housing segment; and
(d) an elongate heat transfer probe permanently positioned in the aircraft drain/fill fitting and in heat transfer contact with the hollow insert element and extending into the exterior housing segment to reduce the incidence of freezing of liquid in the exterior housing when the exterior housing is exposed to a below-freezing environment, wherein:
the elongate heat transfer probe is configured to axially extend along an inner wall of the hollow insert element and be within the flow path of the exterior housing segment.

9. The aircraft drain/fill fitting according to claim 8, wherein the interior and exterior housing segments and the hollow insert element are coaxially aligned and annular.

10. The aircraft drain/fill fitting according to claim 8, wherein the elongate heat transfer probe includes a high thermal transfer coefficient material for efficiently transferring heat from the hollow insert element and along the length of the elongate heat transfer probe.

11. The aircraft drain/fill fitting according to claim 8, wherein the heater comprises an electric conduction heater.

12. The aircraft drain/fill fitting according to claim 8, wherein the elongate heat transfer probe includes a high thermal transfer coefficient material for efficiently transferring heat from the hollow insert element and along the length of the elongate heat transfer probe, and further wherein the heater comprises an electric conduction heater.

13. The aircraft drain/fill fitting according to claim 9, wherein the heat transfer probe is shaped along the length of the hollow insert element to be in heat transfer contact with the inner wall of the hollow insert element and in spaced-apart relation from inner walls of the exterior segment in the flow path within the exterior segment.

14. The aircraft drain/fill fitting according to claim 8, wherein the elongate probe includes a high thermal transfer coefficient material selected from the group consisting of aluminum, copper and graphene, and having a W/mK of between 250 and 5300.

* * * * *